United States Patent

Welch et al.

[11] 3,795,447
[45] Mar. 5, 1974

[54] LASER ANEMOMETER FREQUENCY TO D.C. CONVERTER

[76] Inventors: Nathan E. Welch, 307 Crestwood Dr., Tullahoma, Tenn. 37405; Richard G. Ray, 907 Leona St., Tullahoma, Tenn. 38468

[22] Filed: June 23, 1971

[21] Appl. No.: 155,797

Related U.S. Application Data

[63] Continuation-in-part of Ser. No. 839,526, July 7, 1969, abandoned.

[30] Foreign Application Priority Data
June 29, 1970 Great Britain .................31347/70

[52] U.S. Cl. ............................... 356/28, 324/79 R
[51] Int. Cl. ............................................. G01p 3/36
[58] Field of Search .......... 356/28; 324/79 R; 343/8

[56] References Cited
UNITED STATES PATENTS
2,896,162  7/1959  Berger et al. ..................... 324/79 R
3,584,956  6/1971  Hines et al. ............................ 356/28

OTHER PUBLICATIONS
Foreman, Jr. et al., Proc. of IEEE, March 1966, pp. 424–425

Primary Examiner—Benjamin A. Borchelt
Assistant Examiner—S. C. Buczinski
Attorney, Agent, or Firm—Cushman, Darby & Cushman

[57] ABSTRACT

A method and apparatus for converting frequency information to a DC voltage for use particularly with a laser velocity measuring system whereby a laser beam is passed through a flowing media, and a portion of the Doppler shifted beam is optically combined with the non-shifted beam to produce a fixed homodyne signal which is then applied to a photodetector to produce a modulated electrical signal. This modulated electrical signal is then amplified and delayed by a fixed or variable time interval. Next, the delayed and undelayed signals are mixed together and the output integrated or applied to a low frequency filter to produce a DC signal having an amplitude proportional to the cosine of a constant times the velocity of the flowing media. The amplitude of the coefficient of the cosine function can be readily ascertained by adjusting the variable time delay line until the minimum or maximum value on the DC meter is observed, and then the velocity can be determined by adjusting the time delay until a DC meter has an average fluctuation of zero at which point the speed can be quickly determined from the value of the time delay. Alternatively, the delay line can be fixed and the signal from the flowing media can be mixed with a variable oscillator output signal to produce a signal at any given frequency which will give a zero reading on the DC meter. In a further embodiment a hold and track circuit is employed to cause the output to retain the previous tracked value whenever an interval occurs in which the signal is predominantly noise. In another embodiment a feed back loop is employed to vary the frequency of an oscillator, whose output is mixed with the velocity signal, in order to maintain a null at the output. In yet another embodiment, a digital system is employed to compare the frequency of the velocity signal with the frequency of the signal from a variable frequency oscillator.

5 Claims, 6 Drawing Figures

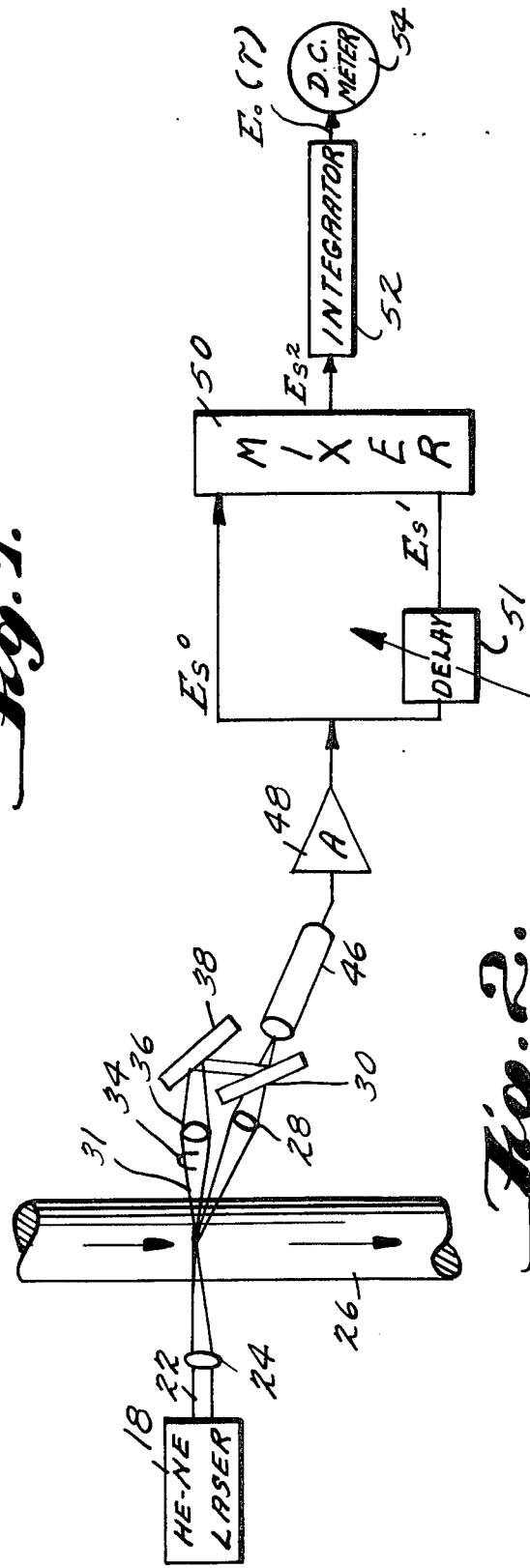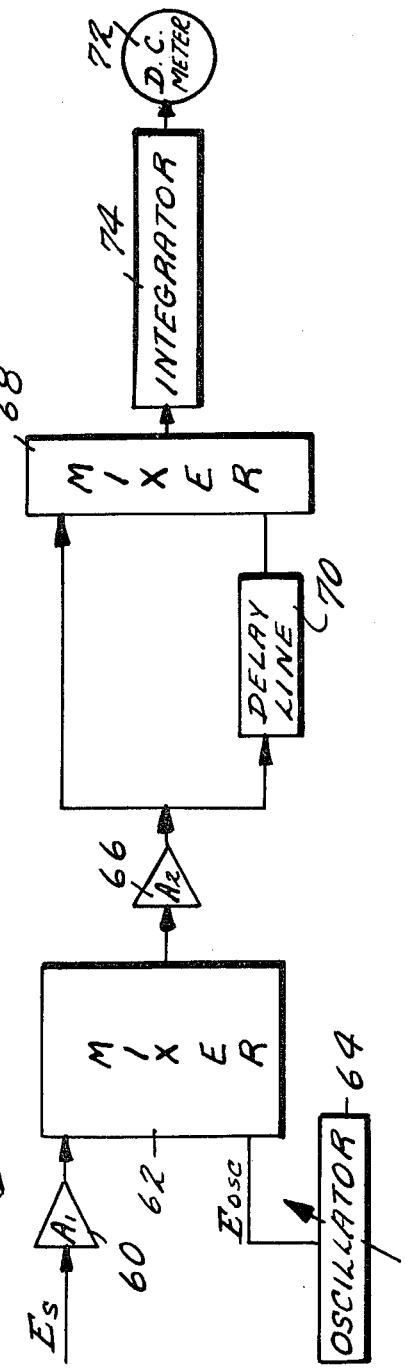

INVENTOR
NATHAN E. WELCH
RICHARD G. RAY
BY
Cushman, Darby & Cushman
ATTORNEYS

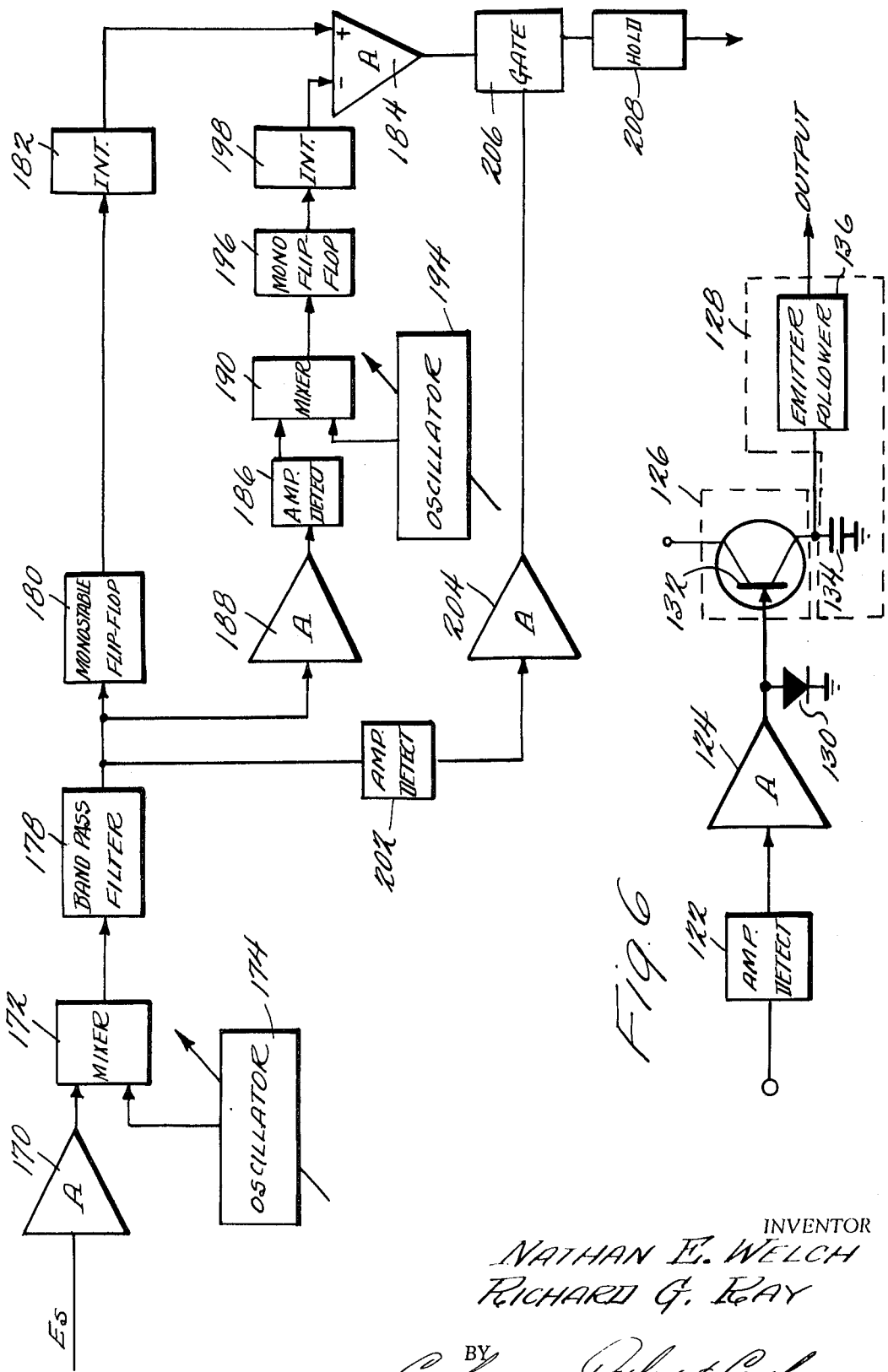

3,795,447

LASER ANEMOMETER FREQUENCY TO D.C. CONVERTER

This application is a continuation-in-part of Ser. No. 839,526, filed July 7, 1969 (now abandoned).

BRIEF DESCRIPTION OF THE PRIOR ART AND SUMMARY OF THE INVENTION

The invention relates to a frequency to DC voltage converter, particularly for use with a laser anemometer system.

Often it is necessary or desirable to measure the velocity of a moving surface or media without disturbing the movement of that surface or media. The need is particularly evident with regard to flowing liquid or gaseous media since the act of measuring velocity with conventional velocity measuring devices alone is often sufficient to alter that velocity substantially. Moreover, conventional measuring devices frequently provide inaccurate data in many applications and further tend to be complex and expensive.

Recently, inexpensive and accurate techniques for using laser beams to measure the velocity of a flowing media, without affecting that velocity in any way, have been developed and are based on the principle that, as monochromatic light scatters from moving particles, the frequency of the light is shifted in a manner equivalent to the well known Doppler effect. In a typical velocity measuring system based on this system, a laser beam from a helium-neon gas laser is split, with half then passing through the media whose velocity is to be determined and the other half passing around the media to be combined with a portion of the scattered, and hence frequency shifted, beam to produce a homodyne signal having a modulation mathematically related to the velocity of the gas media. This arrangement is described in detail in an article entitled, "Laser Beam Measures Velocity" which appeared in CONTROL ENGINEERING in July 1967.

In the past, after the shifted optical homodyne signal had been converted into an analogous electrical signal, the frequency shift was simply and conventionally displayed as a roughly sinusoidal wave on an oscilloscope, a side band on a spectrum analyzer or converted into a DC signal by a phase-lock frequency meter. The drawbacks of using the oscilloscope and the spectrum analyzer are obvious in that they fail to produce an exact analog DC signal which is suitable for further processing or which provides an exact value without further interpretation. Phase-lock frequency meters on the other hand, are conventionally limited in frequency to about 1 MHz, limited in deviation to about 15 percent and limited in deviation rate to about 500 cycles.

The present innovation relates to a unique frequency to a voltage converter which is particularly useful in converting the Doppler frequency shifted signals produced by a speed measuring system such as described briefly above to an analog voltage ouput signal. As described in detail below, the principles of autocorrelation is employed to produce a DC output signal which varies as a constant times the cosine of the product of the speed of the moving media and a variable autocorrelative time delay.

The input modulated homodyne signal, which is usually the output of a photodetector or photomultiplier tube, is first delayed with respect to itself by a given time for example, by passage through a delay line, and then the delayed and undelayed signals are multiplied together to produce an output signal having a DC component which is substantially equal to a constant times the cosine of the product of the electrical AC output of the photodetector or other device and the time delay. By varying the time delay until the amplitude of the output DC output signal is maximized, the coefficient of the cosine function can be readily ascertained and then by adjusting the delay line until the average fluctuation is zero, the AC frequency, and hence the media velocity, can be readily determined from the value of the delay required to produce that zero, and in fact the delay line can be calibrated directly in terms of speed.

Alternatively, the delay line may be fixed and the signal from the photomultiplier or other device first mixed with a signal from a variable frequency oscillator before input into the mixer which performs the autocorrelation. The oscillator frequency is then varied until the average value on the DC meter connected to the output of the autocorrelation mixer is equal to zero, and the velocity can be then determined from the oscillator setting. The oscillator can likewise be calibrated in terms the velocity of the flowing media to give a direct output reading.

However, the arrangement requires repeated evaluation of the sensitivity of the system and further the output tends to be inaccurate during the periodic intervals where the signal is predominantly noise. In one embodiment described below, an automatic gain control amplifier is provided to eliminate the need for sensitivity evaluation and a track and hold circuit is employed to cause the system to ignore the signal during times when it is predominantly noise and instead to maintain the previous tracked values during such intervals. In yet a further embodiment, a feed back loop is employed to cause a voltage controlled oscillator to vary its frequency so as to maintain a D.C. null at the output. A digital system is employed in yet another embodiment to further reduce the problem of noise.

Many other objects and purposes of the invention will become clear from the following detailed description of the drawings.

BRIEF DESCRIPTION OF THE DRAWINGS

FIG. 1 shows the frequency to voltage converter of this invention in block diagram and in combination with a laser velocity measuring system.

FIG. 2 shows another embodiment of the invention employing a variable frequency oscillator and a fixed delay line.

FIG. 5 shows a further modification of the embodiment of FIG. 2 wherein a digital arrangement is employed to compare the frequency of the velocity signal with the frequency of a signal produced by the oscillator.

DETAILED DESCRIPTION OF THE DRAWINGS

Figure 3:
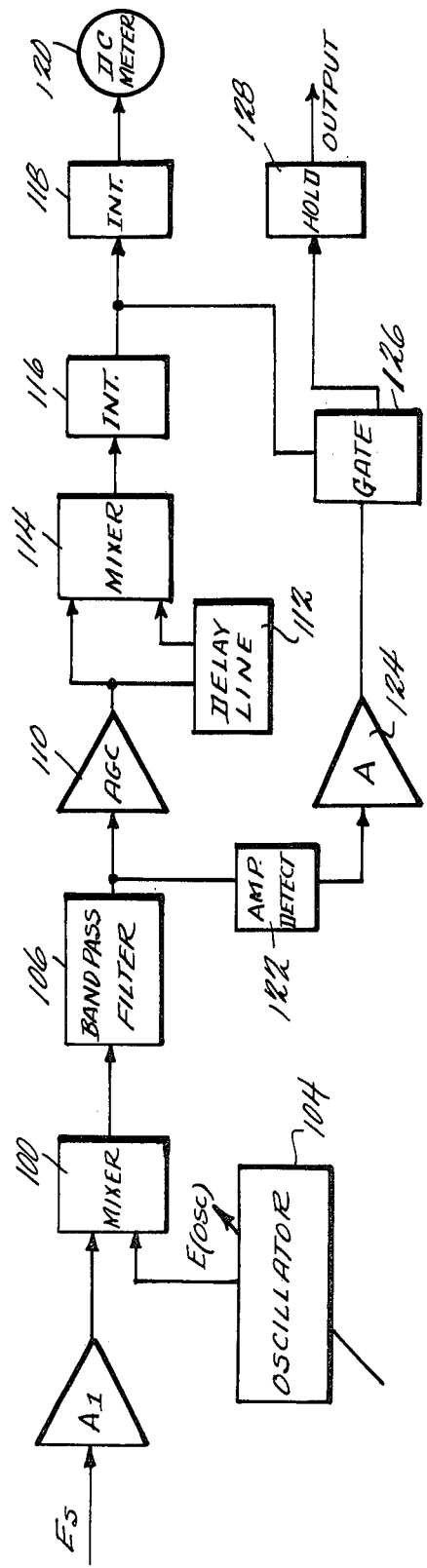
FIG. 3 shows a modification of the embodiment of FIG. 2 wherein a hold and track circuit is employed to apply a previously tracked value to the output during intervals in which the signal is predominantly noise.

Reference is now made to FIG. 1 which shows a laser anemometer or velocity measuring system in use with one embodiment of the novel frequency to voltage converter of this invention which is illustrated as a block diagram. As mentioned briefly above, this laser velocity measuring system operates on the principle that monochromatic light, when scattered from moving particles, undergoes a frequency shift proportional to the velocity of the scattering media. Thus, relatively large frequency shifts are obtainable when a laser, which is an excellent source of light having a very narrow frequency band, is employed as the light source.

The actual magnitude of the Doppler frequency shift depends on the geometry of the scattering as well as the velocity of the moving particles. The following mathematical relation expresses the theoretical relationship between the Doppler shift frequency and the variables which determine that frequency:

$$F_d = (NV/\lambda_0) \sin \theta$$

where $F_d$ = the Doppler shift,
$N$ = Index of Refraction of the flowing media,
$V$ = The velocity of the flowing media,
$\lambda\theta$ = The wave length of incident light, and
$O$ = The angle between the scattered and incident beams.

Since all these variables with the exception of the velocity of the flowing media can be easily determined and controlled for any given media, the analog output signal can be calibrated in terms of velocity alone for any given media.

The monochromatic light for the velocity measuring system shown in FIG. 1 is preferably provided by a neon-helium laser 18 which is capable of producing 10 milliwatts of continuous energy. Light is emitted at a frequency of $4.74 \times 10^{14}$ Hz and at a wave length of 6,328 angstroms. While a neon-helium laser has been shown to be especially satisfactory for the type of measurement illustrated by the embodiment of FIG. 1, any other type of laser or alternative source of monochromatic light can be employed.

The light beam 22 emitted by the laser 18 is first passed through a suitable concave lens 24 which serves to focus the beam 22 onto the flowing media 26 which may be gas, fluid, solid or any combination thereof. In fact, any material which is capable of shifting monochromatic light can be measured by this system. If the material is too opaque to properly pass the laser beam, then the Doppler reflected beam can be employed, and if the flowing media fails to produce scattered light at a suitable intensity, an optical scattering contaminant such as smoke can be added to the flowing media to increase the intensity of the scattered light to a usable level. In the embodiment shown in FIG. 1, the portion of the helium-neon light which passes through the flowing media 26 unscattered is employed as the unshifted reference beam 31. Alternatively, a beam splitter can be used to extract a portion of the laser beam 22 before passage through the media 26 and that portion employed as of reference beam 31.

The laser beam 22 passing through the flowing media 26 is dispersed through a wide variety of angles. However, only the portion of the laser beam scattered through one particular angle, which is chosen in advance, and which in this embodiment is angle $\theta$, is gathered by means of lens 28 and focused on a beam splitter 30 along with the unscattered reference beam 31. Reference beam 31, which is that portion of the beam 22 which passes through the flowing media 26 essentially unscattered, is also focused by a density filter 34 and another concave lens 36 onto a mirror 38 which inturn reflects the reference beam 31 onto the beam splitter 30 which serves to combine the shifted and unshited portions of the original laser beam 22. This combination of shifted and unshifted light is then an optically mixed homodyne which is in effect modulated by the Doppler shifted frequency.

This combined optical signal is then applied to photodetector 46 which serves to produce an analogous electrical signal in place of the optical signal. The electrical signal thus produced, which is modulated in the same manner as the optical signal incident upon photodetector 46, is then passed to an amplifier 48 which may also include a high pass filter to eliminate low frequency noise frequently present from line sources and laser plasma oscillations. The output of the amplifier 48 is passed directly to the balanced mixer 50 as a signal $E_s^0$ and to a variable delay line 51. The output of variable delay line 51 is likewise passed to the mixer 50 as signal $E_s^1$.

As discussed briefly above, the principle of the operation of the arrangement shown in FIGS. 1–5 is based on well known autocorrelation techniques which are widely employed to recover periodic information from signals with high noise levels. This is usually accomplished by continuously multiplying the signal by itself, with one of the multipliers being delayed by a given time with respect to the other. This product is then continuously integrated to produce the autocorrelation function. Now referring to FIG. 1 and assuming that the output signal from amplifier 48, namely signal $E_s^0$, is a frequency modulated signal with random amplitude variation and random noise superimposed, it can be represented as follows:

$$E_S(t) = EP_1(t) \cos W_S t + P_2(t),$$

where $P_1(t)$ and $P_2(t)$ are random variations and $W_S(t)$ is the frequency of the AC output of the photomultiplier tube 46 which is in turn a readily ascertainable function of the velocity of the flowing media 26. $E$ is simply a constant. The variation represented by $P_1(t)$ is distributed between approximately three times the highest frequency of turbulence, which is the frequency of the 0.1 percent amplitude level of the power density spectra, and 1/20th of the frequency representing the means velocity. The noise represented by $P_2(t)$ is normally distributed throughout the frequency spectrum.

The equation for $E_S^1$ which is then output of delay line 51 is as follows:

$$E_S^1(t) = EP_1(t-\tau)\cos W_S(t-\tau) + P_2(t-\tau)$$

Thus the equation for the output $E_S$ of the mixer 50 is as follows:

$$E_S^2(t) = [EP_1(t)\cos W_S t + P_2(t)]$$
$$[EP_1(t-\tau)\cos W_S(t-\tau) + P_2(t-\tau)]$$

or $$E_S^2(t) = E^2 P_1(t)P_1(t-\tau)\cos W_S t \cos W_S(t-\tau)$$
$$EP_2(t)P_1(t-\tau)\cos W_S(t-\tau)$$
$$EP_1(t)P_2(t-\tau)\cos W_S t + P_1(t)P_2(t-\tau)$$

which can be rewritten:

$$E_S{}^2(t) = [E^2P_1(t)P_1(t-\tau)]/2 \ [\text{Cos } W_S\tau + \text{Cos } W_S(2t-\tau)]$$

$$EP_2(t)P_1(t-\tau)\text{Cos } W_S(t-\tau)$$

$$EP_1(t)P_2(t-\tau)\text{Cos } W_St + P_1(t)P_2(t-\tau)$$

It should be noted that all of the terms of the last above equation are periodic cosine functions of time except for the first which is essentially a slightly varying amplitude signal proportional, for a fixed time delay $\tau$, to the cosine of a constant times the frequency of the AC output of the photomultiplier 46, which in turn is proportional to the velocity of the media at a point of measurement. Thus, if the output of the balanced mixer 50 is either passed through a low band filter or an integrater which removes the substantially time variant terms leaving only the first term which varies only slightly with time because of the presence of the noise component $P_1(t)P_1(t-\tau)$, then the frequency $W_S$, which is in turn proportional to the speed of the flowing media, can be easily ascertained.

The integrator 52 which receives the output signal $E_S{}^2$ from mixer 50 may be designed to perform a double integration or as discussed briefly above a low pass filter which has a break frequency that lies sufficiently close to $W_S$ to filter the periodic terms in the above equation can be employed instead. Therefore, the output of either the integrator 52 or such a low pass filter evaluated at some time delay $\tau$ is as follows:

$$E_0(\tau) = E_S{}^2 \ (\tau) \ F = [E^2P_1(t)P_2(t-\tau)]/2 \ \text{Cos } W_S \quad F$$

Since the frequency of $P_1(t)$ is usually considerably greater than the frequency of $W_S$, the coefficient amplitude of the cosine function roughly the mean amplitude of $P_1(t)P_2(t-\tau)$: (:

$$E_0(t) = [(E^2/2) \ P_1(t)P_2(t-\tau)] \ \text{Cos } W_S\tau$$

Thus, the DC meter 54 which receives the signal $E_0(\tau)$ will give an analog reading which will fluctuate slightly in time because of the presence of the noise $P_1(t)$ and $P_2(t)$.

The value of the frequency $W_S$ and hence the velocity of the media can now be easily ascertained as follows. First, the delay line 51 which controls the value of the time delay $\tau$ is adjusted until the output $E_0(t)$ as read on meter 54 is maximized or minimized. By noting the voltage range between the maximum and minimum values, or the amplitude of the minimum or maximum value above the mean reference line, the value of the coefficient $E$ which is equal to the coefficient $E^2/2$ $P_1(t)P_2(t-\tau)$ can be easily determined.

Next, the delay line 51 is set so that the DC meter 54 fluctuates about zero with the average fluctuation being at zero. Preferably, the second zero of the cosine function at 270° or $3\pi/2$ is employed as this zero point since this point has been found to result in greater sensitivity and less noise than the first zero at 90°. The location of this zero can be easily ascertained as the point in which the DC meter reading moves between negative and positive values through zero. At the point at which the mean output of DC meter 54 is zero, obviously the cosine function is equal to zero and the produce $W_S\tau$ is necessarily equal to $3\pi/2$. Accordingly, the frequency $W_S$ is equal to $3\pi/2\tau$, and the dial or knob which adjusts the delay line 51 can be calibrated directly in feet per second to give the value of the velocity of the media.

Thus, after the initial calibration for the coefficient of the output signal appearing on the DC meter has been made, checking the velocity of any flowing media is a simple matter of adjusting the delay line 51 until the DC meter 54 fluctuates about zero and then reading the speed of the flowing media directly in feet per second. The sensitivity at the point of measurement for this arrangement can be obtained by simply taking the derivative of the equation giving the output signal as follows:

$$\frac{dE_0(t)}{df_S} = \bar{E}\frac{3}{2}\frac{\pi}{\bar{f}_S}\text{Sin}\frac{3}{2}\frac{\bar{f}_S}{\bar{f}_S} = \frac{\pi}{\bar{E}}\frac{3}{2}\frac{\pi}{F_S}$$

$$f_S = \bar{f}_S$$

$$\frac{dE_0(t)}{df_S} = \bar{E}\frac{3}{2}\frac{\pi}{\bar{f}_S}\left(\frac{\text{Millivolts}}{\text{Megahertz}}\right)$$

$$f_S = \bar{f}_S$$

FIG. 2 shows a modification of the arrangement shown in FIG. 1 which employs a fixed delay line rather than the variable delay line illustrated in FIG. 1. In this arrangement, the output of a photomultiplier tube, such as the tube 46 shown in the FIG. 1, is applied via an amplifier 60 to a mixer 62 which also receives the signals from a variable frequency oscillator 64. The output or mixer 62 is passed to an amplifier 66 whose output is applied to a second mixer 68 and a delay line 70 which in turn conveys its output to the mixer 68 which serves the same function as the mixer 50 in FIG. 1. The output of mixer 68 is likewise passed to a DC meter 72 via an integrator 74 which both serve the same functions as in FIG. 1.

The delay line 70 is preset so that with a signal input at a given frequency, the DC meter will fluctuate about the second zero of the cosine function in the same manner as described above. Thus, if the oscillator 64 is adjusted until the output of the mixer 62 is at that preset frequency which occurs when the meter 72 is at the second zero, the frequency $W_S$ of the input signal $E_S$ can be ascertained from the adjustment of oscillator 64 and the velocity of the flowing media can likewise be easily determined from $W_S$. The advantage of the system shown in FIG. 2 is the fact that a fixed delay time allows operation from substantially the same calibration for all frequencies and allows measuring virtually any desired velocity range.

Reference is now made to FIG. 3 which shows a modification of the embodiment of FIG. 2. As mentioned briefly above, this arrangement has at least two notable advantages over the embodiment of FIG. 2. First, in FIG. 3 the sensitivity is substantially constant, thus eliminating the need for sensitivity evaluation. Second, the system of FIG. 3 is designed to ignore those recurring intervals in which the high noise content of the signal renders it unsatisfactory.

As in the embodiment of FIG. 2, the signal $E_s$, which is derived in the same fashion as the corresponding signal in FIG. 1, is applied to a conventional mixer 100 via amplifier 102. Mixer 100 receives as its other input the output of variable frequency oscillator 104 which is adjusted and used to determine the velocity of a flowing media in the same manner as oscillator 64 of FIG. 2. The output of mixer 100 is passed through band pass filter 106 which eliminates as much noise and other undesirable frequency components as possible.

A conventional automatic gain control amplifier 110 receives the output of filter 106 and maintains an output at a substantially constant peak to peak voltage, e.g., 1 volt. This constant signal is applied both directly and via a delay line 112 to another mixer 114 whose output is integrated successively by integrators 116 and 118 which remove frequency variant components and the final P.C signal is then displayed on meter 120.

However, the signal $E_x$ is not normally continuous to that periodically intervals occur in which the output of amplifier 110 is virtually all noise, i.e., the signal output of amplifier 110 has a high noise to signal ratio. During these intervals the output displayed on meter 120 will, of course, be inaccurate.

Accordingly, in the embodiment of FIG. 3, a hold and track circuit is provided which tracks the output of integrator 116 during substantially noise free periods; holds the previously tracked value during noisy intervals and applies the retained signal to its output during noisy intervals. Since the rate at which noise intervals occur is usually much greater than the rate of change of frequency of the input signal, no frequency information is lost by this process.

In FIG. 3, this tracking and holding is accomplished by applying the output of filter 106 to an amplitude detector 122. Detector 122 may be simply a half wave diode rectifier and a low pass filter which serve to recover the amplitude modulation from the signal output of filter 106. The signal output of detector 122 is amplified by amplifier 124 and then applied to gate 126. Gate 126 responds to the signal applied to it, or is controlled by elements responsive to the signal produced by detector 124, so that, during low noise to signal ratio periods, gate 126 connects the output of integrator 116 to conventional hold and track circuit 128 and, during periods of high noise to signal ratio; gate 126 disconnects circuit 128 from integrator 116. Thus the output of circuit 128 is substantially the same as the output of integrator 116 during predominantly noise free intervals, but ignores the output of integrator 116 during noisy intervals and instead reflects the signal retained during the previous predominantly noise free interval. The output of hold and track circuit 128 may be displayed in any suitable fashion, e.g., on a D.C. meter.

FIG. 6 shows in detail one holding and tracking arrangement suitable for use with the embodiment of FIG. 3. In this arrangement the output of amplifier 124, which is preferably a saturation amplifier, is locked to ground by a diode 130. This output of amplifier 124 is also connected to the base of a field effect transistor 132 which comprises gate 126. The output of integrator 116 is connected to the source of transistor 132 and the drain is connected to the hold circuit 128 which is comprised of a grounded capacitor 134 feeding a conventional emitter follower circuit 136, which is designed to have a high input impedance.

During predominantly noise free intervals, the signal amplitude detected by detector 122 will be high and accordingly the output of amplifier 124 will be roughly at ground, thus permitting the D.C. signal output of integrator 116 to pass through transistor 132 and charge capacitor 134, which thus tracks the output of integrator 116. However, when a noisy interval arrives, the output of amplifier 124 will drop below ground so that transistor 132 assumes its non-conductive state so that the output of integrator 116 cannot pass through gate 126. Furthermore, since the impedance of transistor 132 in its non-conductive state is virtually infinite and the input impedance of emitter follower 136 is high, capacitor 134 holds almost all of its charge during the noisy interval so that the output of emitter follower 136 reflects this charge in its output during the noisy interval instead of the output of integrator 116.

When a predominantly noise free signal arrives, gate 126 reopens as transistor 132 shifts back to its conductive state and capacitor 134 resumes tracking the output of integrator 116. Since transistor 132 has virtually zero impedance in its conductive state, the held charge on capacitor 134 is filtered along with the new D.C. output of integrator 116.

As discussed above, the error produced by random noise, amplitude modulation and dropout is zero at the null point. Therefore, if the frequency of the oscillator signal produced by oscillator 64 in FIG. 2 is varied such that the D.C. output of integrator 74 is kept at zero at all times, the signal extracted from the oscillator will be virtually error free. This output signal can then be delivered to any standard frequency to voltage converter, such as a frequency discriminator.

Figure 4:
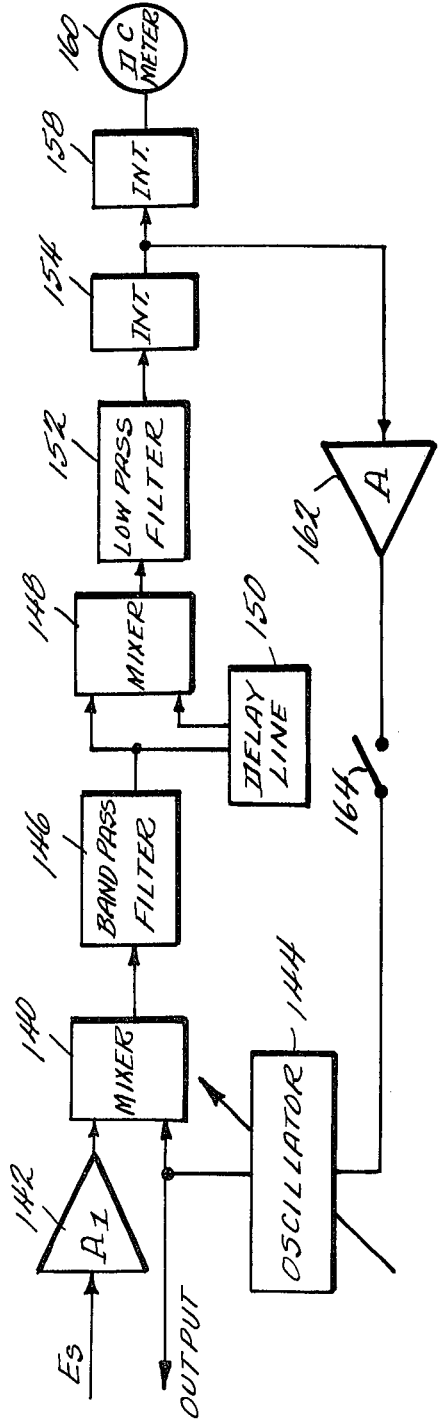
FIG. 4 shows another modification of the embodiment of FIG. 2 wherein the frequency of the oscillator is varied by a feed back loop to keep the D.C. output at a null.

FIG. 4 illustrates one simple arrangement for keeping the output of the integrator at zero. As in FIG. 2, the input signal $E_s$ is applied via amplifier 142 to a mixer 140 whose other input is from voltage controlled oscillator 144. The output of mixer 140 is applied via band pass filter 146 to mixer 148 both directly and via delay line 150. The output of mixer 148 passes through low pass filter 152 and is integrated by integrator 154. A second integrator 156 receives and integrates the output of integrator 158 and produces a signal which is applied to D.C. meter 160.

The D.C. output of integrator 154 is amplified by a conventional amplifier 162 and delivered to voltage controlled oscillator 144, which is a type of device which is well known. To operate the system, manual switch 164 is first opened and the oscillator frequency then manually adjusted to produce a long time average null at D.C. meter 160. Switch 164 is then reclosed. Thereafter the frequency of signal produced by oscillator 144 increases as the output of integrator goes negative and decreases as it goes positive, thereby maintaining a virtually error free signal at the output of integrator 154. Since the frequency response of the system is greater than the frequency changes that occur in the signal and the system is a stable first order system, it is possible to maintain a gain at amplifier 162 sufficient to hold the error signal within roughly 0.5 percent.

FIG. 5 illustrates another modification of the circuit of FIG. 2. In this embodiment, as in FIG. 2, an input signal $E_s$ is applied, via amplifier 170 to a conventional mixer 172 which has as its other input the output of oscillator 174. The output of mixer 172 is transmitted through band pass filter 178. However, the mixer 68, delay line 70 and integrator 74 of FIG. 2 are replaced in FIG. 5 by a digital system in which the signals employed are virtually noise-free.

The output of filter 178 is applied to a conventional monostable multivibrator or flip-flop 180 which triggers at a predetermined level to produce a pulse of a fixed width. Thus, whether or not the amplitude of the signal produced by filter 178 remains the same, the separation between adjacent pulses produced by flip-flop 180 varies with the frequency as does the D.C. level of the pulse train. This D.C. level is detected by integrator 182 and is applied to one input of differential amplifier 184.

The output of filter 178 is also applied to conventional amplitude detector 186 via amplifier 188. Detector 186 recovers the amplitude modulation from the signal. The output of amplitude detector 186 is applied to mixer 190 together with the output of variable oscillator 194 and the output of mixer 190 is applied to a second monostable flip-flop 196, which, like flip-flop 180, triggers at a predetermined level to produce a pulse of a fixed width. The pulse train produced by flip-flop 196 is integrated by integrator 198 and applied as the other input to differentail amplifier 184. The output of amplifier 184 is the difference between the two inputs and this output is applied to a hold and track circuit, including detector 202, amplifier 204, gate 206 and hold circuit 208, which operates in the same fashion described above with regard to FIG. 3.

Since the flip-flops 180 and 196 trigger at a predetermined level, variations in the amplitude of the input signal vary the point on the sine wave signal applied at which triggering occurs. However, since the amplifier 188, detector 186 and mixer 190 cause the amplitude of the signal applied to flip-flop 196 to vary with the amplitude of the signal applied to flip-flop 180, the gain of amplifier 188 can be easily adjusted so that both flip-flops trigger at the same point in the respective sine wave signals applied to flip-flops 180 and 196, whatever that point may be. Accordingly, the difference between the two D.C. signals applied to amplifier 184 is a function of the difference in frequency between the signal applied to flip-flop 180 and the frequency of oscillator 194. This digital system not only reduces the effect of temperature drift and reduces noise but also is compatible with the above described embodiments of FIGS. 3 and 4.

Many other changes and modifications in the above described embodiments of the invention can, of course, be made without departing from the scope of the invention. Accordingly, that scope is intended to be limited only by the scope of the appended claims.

What is claimed is:

1. A velocity measuring system comprising:
   means for producing a beam of monochromatic light,
   means for directing at least a portion of said beam onto a flowing media so that at least a portion of the directed beam is shifted in frequency by an amount proportional to the velocity of said flowing media,
   means for combining at least a part of said shifted portion of said beam with an unshifted beam of monochromatic light to produce a combined beam,
   means for converting said combined beam into a first electrical signal, varying in amplitude in the same manner as said combined beam varied in intensity,
   means for delaying said first electrical signal for a given delay time so that a second electrical signal is produced,
   means for mixing said first and second signals to produce a third signal having a substantially time invariant component,
   means for removing time variant components from said third signal to produce a fourth signal having an ampliitude which is a function of said velocity,
   means for receiving said first electrical signal and for determining from said first signal when said fourth signal has a signal to noise ratio below a predetermined value, and
   means for tracking said fourth signal and holding the previously tracked value during intervals in which said receiving and determining means determines that said fourth signal has a signal to noise ratio below said predetermined value.

2. A system as in claim 1 further including an automatic gain amplifier for receiving said first signal and applying its output to said mixing means and to said delaying means.

3. A system as in claim 1 further including gate means connected to said receiving and determining means for passing said fourth signal to said tracking and holding means when said receiving and determining means determines that said fourth signal has a signal to noise ratio above said predetermined value and for preventing said fourth signal from being applied to said receiving and tracking means when said receiving and determining means determines that said fourth signal has a signal to noise ratio below said predetermined value.

4. A system as in claim 3 wherein said receiving and determining means includes an amplitude detector, an amplifier for receiving the output of said detector and a diode locking the output of said amplifier to ground, wherein said gate means is a field effect transistor having its gate connected to the output of said amplifier, one of its other terminals connected to the output of said removing means and its third terminal connected to said tracking and holding means and wherein said tracking and holding means includes a capacitor connected between said third terminal and ground for tracking said fourth signal and an emitter follower having its input connected to said third terminal.

5. A method of measuring the velocity of a flowing media comprising the steps of:
   directing a beam of monochromatic light onto said media so that a portion of said beam is shifted in frequency an amount proportional to the velocity of said media,
   combining the shifted beam with an unshifted beam to produce a combined beam,
   converting said combined beam into a first electrical signal varying in amplitude in the same manner as said combined beam varied in intensity,
   mixing said first electrical signal with a sinusoidal signal from a variable frequency oscillator to produce a second electrical signal,
   delaying said second electrical signal in time to produce a third electrical signal,
   multiplying said third and second electrical signals together to produce a fourth signal having a substantially time invariant term which is proportional to said velocity,
   determining from said first signal when said fourth signal has a signal to noise ratio below a predetermined value,
   tracking said fourth signal during intervals in which said fourth signal has a signal to noise ratio above said predetermined value, and
   holding the previously tracked value during intervals in which said fourth signal has a signal to noise ratio above said predetermined value.

* * * * *